(12) United States Patent
Bernitsas et al.

(10) Patent No.: US 8,047,232 B2
(45) Date of Patent: *Nov. 1, 2011

(54) ENHANCEMENT OF VORTEX INDUCED FORCES AND MOTION THROUGH SURFACE ROUGHNESS CONTROL

(75) Inventors: Michael M. Bernitsas, Saline, MI (US); Kamaldev Raghavan, Houston, TX (US)

(73) Assignee: The Regents of The University of Michigan, Ann Arbor, MI (US)

( * ) Notice: Subject to any disclaimer, the term of this patent is extended or adjusted under 35 U.S.C. 154(b) by 368 days.

This patent is subject to a terminal disclaimer.

(21) Appl. No.: 12/277,321

(22) Filed: Nov. 25, 2008

(65) Prior Publication Data

US 2009/0250129 A1    Oct. 8, 2009

Related U.S. Application Data

(63) Continuation of application No. 12/125,380, filed on May 22, 2008, and a continuation-in-part of application No. 11/272,504, filed on Nov. 10, 2005, now Pat. No. 7,493,759.

(60) Provisional application No. 60/931,957, filed on May 25, 2007, provisional application No. 60/628,152, filed on Nov. 15, 2004.

(51) Int. Cl.
*F15C 1/16* (2006.01)
(52) U.S. Cl. ................................ 137/808; 290/53; 416/6
(58) Field of Classification Search .................. 137/803, 137/808, 810; 416/6, 79; 290/42, 53
See application file for complete search history.

(56) References Cited

U.S. PATENT DOCUMENTS

| | | | |
|---|---|---|---|
| 5,715,946 A * | 2/1998 | Reichenbach | 209/156 |
| 6,619,887 B1 | 9/2003 | Szewczyk et al. | |
| 6,726,407 B1 * | 4/2004 | Steinkamp et al. | 405/211 |
| 6,851,930 B2 * | 2/2005 | Pal | 416/1 |
| 6,872,048 B2 * | 3/2005 | Uselton et al. | 415/119 |
| 6,908,063 B2 * | 6/2005 | Bearman et al. | 244/130 |

OTHER PUBLICATIONS

Kumar, Raghavan A., Sohn, Chan-Hyun and Gowda, Bangalore H.L., "*Passive Control of Vortex-Induced Vibrations: An Overview*," Recent Patents on Mechanical Engineering, 2008, vol. 1, No. 1, pp. 1-11.

* cited by examiner

*Primary Examiner* — Craig Schneider
(74) *Attorney, Agent, or Firm* — Harness, Dickey & Pierce, P.L.C.

(57) ABSTRACT

Roughness is added to the surface of a bluff body in a relative motion with respect to a fluid. The amount, size, and distribution of roughness on the body surface is controlled passively or actively to modify the flow around the body and subsequently the Vortex Induced Forces and Motion (VIFM). The added roughness, when designed and implemented appropriately, affects in a predetermined way the boundary layer, the separation of the boundary layer, the level of turbulence, the wake, the drag and lift forces, and consequently the Vortex Induced Motion (VIM), and the fluid-structure interaction. The goal of surface roughness control is to increase Vortex Induced Forces and Motion. Enhancement is needed in such applications as harnessing of clean and renewable energy from ocean/river currents using the ocean energy converter VIVACE (Vortex Induced Vibration for Aquatic Clean Energy).

16 Claims, 9 Drawing Sheets

ENHANCEMENT OF VORTEX INDUCED FORCES AND MOTION THROUGH SURFACE ROUGHNESS CONTROL

CROSS-REFERENCE TO RELATED APPLICATIONS

This application is a continuation of U.S. application Ser. No. 12/125,380 filed on May 22, 2008, which claims the benefit of U.S. Provisional Application No. 60/931,957 filed on May 25, 2007. This application is also a continuation-in-part of U.S. application Ser. No. 11/272,504 filed on Nov. 10, 2005, which claims the benefit of U.S. Provisional Application No. 60/628,152 filed on Nov. 15, 2004. The disclosure of the above applications is incorporated herein by reference.

GOVERNMENT INTEREST

This invention was made with government support under N00014-03-1-0983 awarded by the Office of Naval Research and DE-FG36-05GO15162 awarded by the Department of Energy. The government has certain rights in the invention.

FIELD

The present disclosure relates to enhancement of vortex induced forces and, more particularly, relates to enhancement of vortex induced forces using surface roughness control.

BACKGROUND AND SUMMARY

The statements in this section merely provide background information related to the present disclosure and may not constitute prior art.

Roughness is added to the surface of a bluff body in a relative motion with respect to a fluid. The amount, size, and distribution of roughness on the body surface is controlled passively or actively to modify the flow around the body and subsequently the Vortex Induced Forces and Motion (VIFM). The added roughness, when designed and implemented appropriately, affects in a predetermined way the boundary layer, the separation of the boundary layer, the level of turbulence, the wake, the drag and lift forces, and consequently the Vortex Induced Motion (VIM), and the fluid-structure interaction. The goal of surface roughness control is to increase Vortex Induced Forces and Motion, which in some applications can provide enormous benefits, such as in the harnessing of clean and renewable energy from ocean/river currents using the ocean energy converter VIVACE (Vortex Induced Vibration for Aquatic Clean Energy). The name of the present teachings is VIM-Enhance and is based on Surface Roughness Control (SRC). It is hereafter referred to as VIM-Enhance+SRC Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
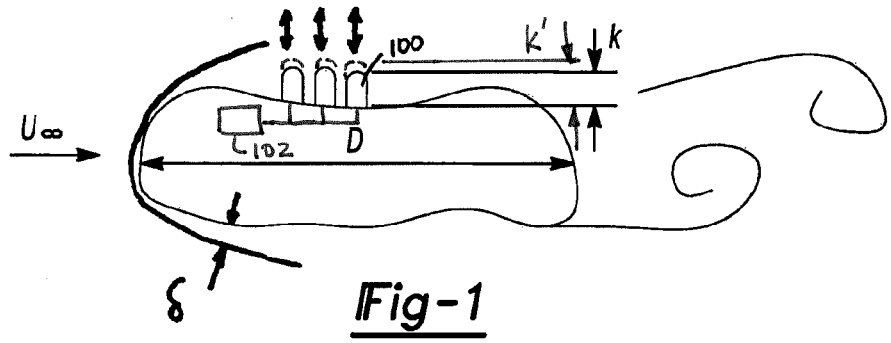
FIG. 1 is a schematic drawing illustrating roughness in terms of a protuberance on a body.

The following description is merely exemplary in nature and is not intended to limit the present disclosure, application, or uses.

1.1 General Principles

There are three types of fluid induced loading on a structure which may result in structural vibration: (a) Extraneously Induced Excitation (EIE), (b) Instability-Induced Excitation (IIE), and (c) Movement Induced Excitation (MIE). In each case, the fluid relative flow initiates excitation. For bluff bodies in relative flows, shedding of large vortices occur following flow separation at the end of the boundary layer and coalescence of vorticity generated at the boundary layer and along the shear layer into large vortices. The latter are called von Karman vortices and have a core diameter (dr) on the order of the bluff body linear body dimension (D) transverse/perpendicular to the flow. Hereafter, vortex shedding refers to von Karman vortices.

Control of vortex dampening behind a bluff body and control of vortex induced motion of a bluff elastic body or bluff rigid body on elastic support have been topics of research and patenting for over a hundred years. Applications appear in several engineering disciplines such as offshore engineering, aerospace, mechanical, civil, nuclear, and power transmission. In ocean engineering, suppression of vortex shedding is important because of the destructive effect of vortex induced vibration on marine risers, underwater pipelines, SPAR offshore platforms, etc. In other engineering disciplines, Vortex Induced Vibration (VIV) of cylindrical structures, such as tubes in heat exchangers, cooling towers, nuclear fuel rods, and smoke stacks can be destructive and must be suppressed. On the contrary, in marine renewable energy conversion, for example, using the VIVACE converter, vortex shedding and Vortex Induced Forces and Motion (VIFM) are enhanced. Such control of vortex shedding for enhancement of VIFM can be achieved by active control, passive control, or combination thereof.

Hereafter the present teachings are referred to as VIM-Enhance+SRC. In accordance with these teachings, VIM control by introducing Surface Roughness Control (SRC) on the structure can be achieved. The goal is to enhance VIFM using SRC.

Recently, enhancement of VIFM has become important in the case of utilization of VIM to harness hydrokinetic energy from ocean/river currents, using devices such as the VIVACE converter. It should be appreciated, however, that the present teachings have a wide variety of applicability in other applications and environments.

2.1. The Underlying Concepts

The underlying principles for the present teachings (VIM-Enhance+SRC) are the following two:

Principle #1: Increasing the correlation length using surface roughness

Surface roughness of appropriate size and distribution can increase the spanwise correlation of vortex shedding along a bluff body. Increasing the correlation length results in increased lift forces and subsequently increased VIFM.

Principle # 2: Controlling the boundary layer turbulence using surface roughness Surface roughness of appropriate size and distribution can increase turbulence at the boundary layer scale which feeds the shear layer along a bluff body and in turn affects the momentum of the separating shear layer. VIM-Enhance+SRC uses these two principles to increase VIFM.

2.2. Terminology

Terms that are used in describing the present teaching of enhancing VIM using Surface Roughness Control (SRC), as well as the physics behind it, are defined below:

Structure refers to a body in a relative fluid flow. The body can be elastic, elastically mounted, rigid, or a combination of structural parts thereof. Vortex shedding behind the structure (typically a bluff body) is expected. Shed vortices may induce forcing and motion.

A bluff body has a non-streamlined shape that produces considerable resistance when immersed in a moving fluid. A region of separated flow occurs over a large portion of the surface of a bluff body, which results in a high pressure drag force and a large wake region. The flow often exhibits unsteadiness in the form of periodic vortex formation and shedding, which may result in periodic forces transverse (lift forces) to the fluid flow. Bluff bodies are widely encountered in many engineering applications and design problems, including bridges, stacks, towers, offshore pipelines, offshore structures, heat exchangers, mooring lines, flagpoles, car antennas, and any circular or cylindrical body having a size ranging from about 0.1 mm or larger.

In some embodiments, surface roughness can be defined as any two or three-dimensional excrescence whose dimension perpendicular to the body surface, k, is on the order of the boundary layer thickness. However, in some embodiments, surface roughness can be defined as any two or three-dimensional excrescence whose dimension perpendicular to the body surface, k, is no more than about 5% of the largest linear dimension, D, of the cross section of the bluff body in the plane of the flow. For example, a plane perpendicular to an axis of a cylindrical member (e.g. a circle) defines a plane of the fluid flow. Such elements can be closely or sparsely packed. Depending on the application, roughness may cover the entire structure or any part thereof. According to the present teachings, three-dimensional roughness elements are used. Roughness textures can contain irregular size and shape of excrescences—uniformly or non-uniformly distributed. Examples include: pyramidal, grooves, brickwall type, and wire gauze. Roughness can be hard or soft. It should also be appreciated that such surface roughness can be in the form of affix members, such as sandpaper or other friction member; can be machined or otherwise formed on the bluff body; can be an active configurable member(s); and the like.

Passive/active control refers to the way of applying surface roughness to control turbulence generated in the boundary layer. Passive control implies that the added roughness is fixed on the surface of the structure and is not adjustable to meet flow fluctuations. Active control implies that distribution and/or size of applied surface roughness are altered during operation depending on flow conditions.

Boundary layer is the layer of fluid in the immediate vicinity of the structure. A measure of its thickness, $\delta$, is the distance perpendicular to the surface of the structure where the flow velocity has reached 99% of the outer flow velocity ($U_\infty$). The relative flow velocity on the surface of an impermeable/nonporous structure is zero.

Separation point is the point on the surface of the structure where the gradient of the relative velocity tangential to the surface of the structure with respect to the direction perpendicular to the surface of the body is zero.

Flow Turbulence refers to the three dimensional, unsteady motions of fluid particles in a practically chaotic manner.

Wake is the region of turbulence immediately to the rear of a solid body caused by the flow of fluid around the body.

Von Karman vortices are the vortices formed behind a bluff body, such as a cylinder. By coalescence of vorticity generated at the boundary layer and the shear layer on each side of the bluff body.

Drag is the force that resists the movement of a body through a fluid or the movement of the fluid around the body. Drag is the sum of frictional forces, which act tangentially to the body surface, and the component of the pressure forces parallel to the fluid flow. For a body, the drag is the sum of fluid dynamic forces in the direction parallel to the fluid flow.

Lift is the sum of all the fluid dynamic forces on a body in the direction perpendicular to the direction of the relative fluid flow.

Fluid-structure interaction is the phenomenon where the fluid forces exerted on the structure move or deform the structure whose motion in turn affects the fluid forces exerted on the structure. Thus, the dynamics of the structure and the fluid are interdependent.

Vortex Induced Motion (VIM) is a fluid-structure interaction phenomenon where the motion of a bluff structure is induced primarily by the vortices shed into the wake of the structure due to the relative flow between the fluid and the structure.

Figure 2:
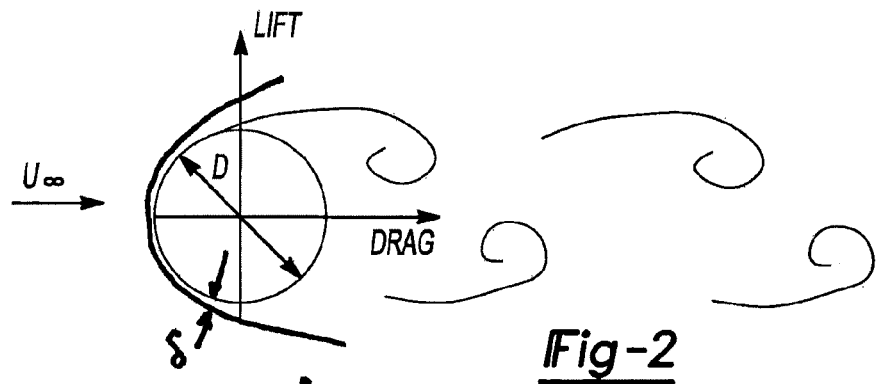
FIG. 2 is a schematic drawing illustrating vortex formation and wake.

Vortex Induced Vibration (VIV) is a special case of VIM where forcing is predominantly periodic. A well known VIV phenomenon may occur when a flexible circular cylinder or a rigid circular cylinder on elastic support is placed in a steady flow with its axis perpendicular to the direction to the flow. In VIV, synchronization of vortex shedding and cylinder oscillation occurs over a broad range of flow velocities. FIG. 2 shows a typical periodic vortex formation and wake for a circular cylinder in VIV.

Vortex Induced Forces and Motion (VIFM) refers to both the forces and motion induced by vortex shedding.

2.3. Method of Control of Vortex Induced Forces and Motion (VIFM)

The method implemented according to the present teachings, in order to control the VIFM of the structure, is based on Principles #1 and #2 above. Specifically, surface roughness is added, to modify passively or actively, the strength and three-dimensional distribution of turbulence which in turn affects vortex shedding, and subsequently vortex induced motion of the structure. The three elements of control of the method implemented according to the present teachings are surface roughness control, turbulence control, and control of vortex induced forces and motion, which are described next.

Surface Roughness Control:

An objective of surface roughness is to alter vortex shedding and its effects, including but not limited to vortex induced forces and vortex induced motion. To this end, part or all of the surface of the structure may be covered by roughness elements.

Figure 3:
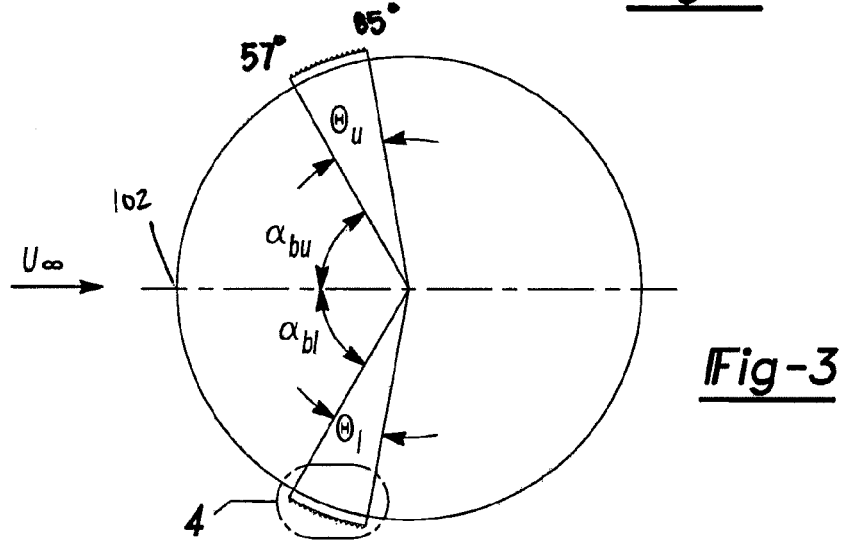
FIG. 3 is a schematic drawing illustrating a surface roughness member, in the form of sandpaper, formed on a body.
Figure 4:
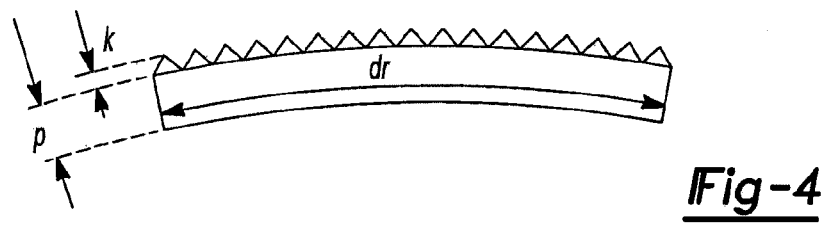
FIG. 4 is an enlarged schematic drawing illustrating the surface roughness member of FIG. 3.
Figure 5:
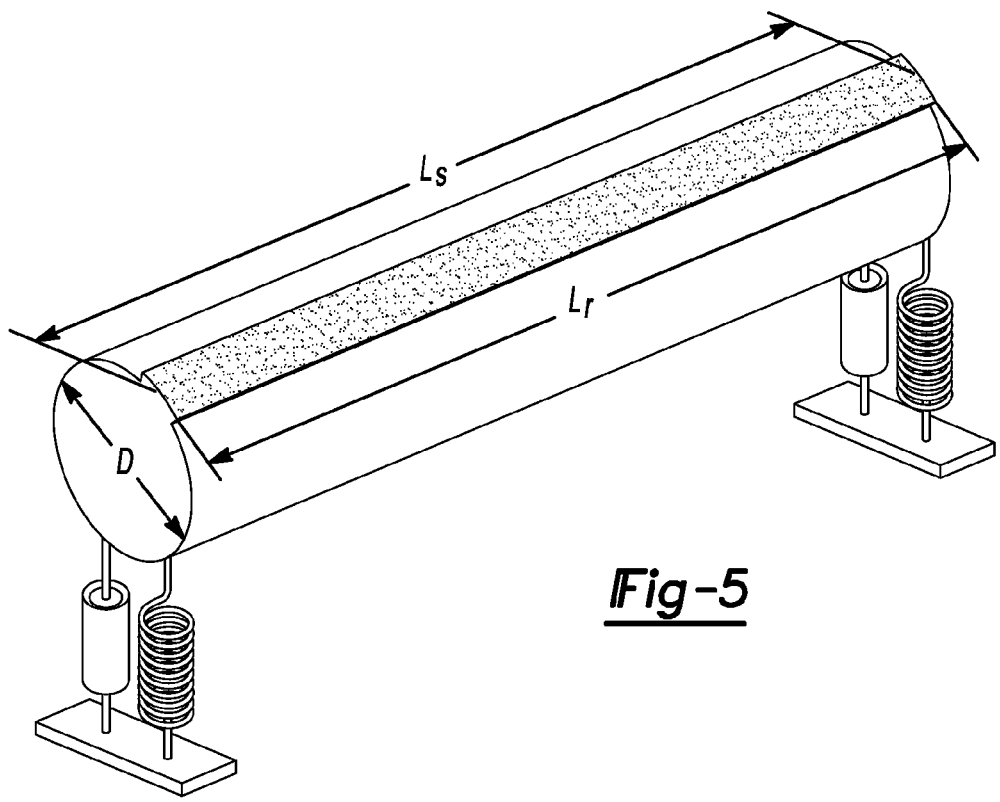
FIG. 5 is a schematic perspective view illustrating an enhancement of VIFM using SRC according to the principles of the present teachings.

Distribution of surface roughness depends on the objective of decreasing or increasing vortex induced forces and motion. FIGS. 3, 4 and 5 depict one method of distributing roughness to enhance vortex shedding and amplify vortex induced forces and motion as required in hydrokinetic energy harnessing, such as those implemented in the VIVACE converter, according to the principles of the present invention.

Passive roughness control consists of distributing roughness elements on the surface of the structure permanently without the possibility of adjusting their configuration during the flow.

Active roughness control consists of altering size and distribution of the roughness on the surface of the structure based on relative flow characteristics such as direction and magnitude of velocity, which affect properties of the boundary layer such as thickness and separation.

Turbulence Control:

The present teachings, VIM-Enhance+SRC, control the amount and distribution of turbulence in a flow past a structure by distributing roughness on the surface of the body as discussed herein. Some specific ways in which surface roughness affects turbulence and consequently the flow past the structure are described herein.

Control of Flow Correlation Using Roughness:

Spanwise vortex shedding correlation behind a bluff body is typically limited. For example, for a stationary cylinder in a steady flow perpendicular to its axis, the correlation length $l_c$ is 2-3 cylinder diameters. Theoretically, VIV induces infinite correlation length resulting in increased VIFM. In practice, the correlation length in VIV is large but finite. A way of controlling VIFM is by controlling the correlation length. Increase in the correlation length results in increased Vortex Induced Forces and Motion.

FIG. 5 shows use of a straight roughness strip or zone of length $L_r$ equal to the structural length $L_s$. Experimental results show that roughness strip increases correlation length. This strip is more effective than a trip-wire because of the inherent oscillatory nature of the separation point. The roughness strips accommodate the oscillatory nature of the separation points because of their depth $d_r$ as shown in FIG. 4. Further, the roughness elements on the strip act like vortex generators or turbulators, thus generating vorticity of the boundary layer scale, which further enhances shed vortices and induced VIFM.

Another application of control of flow correlation using this surface roughness control (SRC) is in the regime of transition of flow from laminar to turbulent (critical regime). Surface roughness restores vortex shedding and establishes a spanwise correlation even in the critical regime, where those don't exist without surface roughness. This enables sustaining and enhancing VIV even in the critical regime.

Control of Flow Separation Using Roughness:

A flow past a structure typically separates at two separation points, one on each side of any cross section of the structure. Using the roughness strips before the regular separation point determines the nature of the flow downstream. The flow can be laminar, or in transition between laminar and turbulent, or turbulent. In each case, control of separation using roughness may have different effect on the flow and consequently VIFM.

The most profound effect of separation point control appears in the critical flow regime. Transition from laminar to turbulent flow can be controlled using roughness strip/s. This exploits the concept of tripping the boundary layer and energizing the boundary layer with eddies that are shed from the roughness elements in the roughness strip/s. Depending on the size, width, height of the strips and the location of the roughness strip/s, the flow can be controlled to reattach in a laminar or turbulent manner forming a separation bubble. The size of the separation bubble can be controlled changing the roughness configuration. The size of the separation bubble is linked to the pressure loss; the larger the bubble, the larger the loss of pressure, and the larger the loss in lift.

Control of Coanda Effect on the Body Near Free Surface:

Using roughness strips of appropriate size and roughness distribution we have enhanced VIFM in the lab, bringing a cylinder in VIV closer to the free surface. These roughness strips permit postponement of the Coanda effect and maintain a strong vortex street.

Control of Vortex Induced Forces and Motion:

In some embodiments, the goal of the present teachings, VIM-Enhance+SRC, is to increase Vortex Induced Forces and Motion. This is achieved by controlling turbulence as described herein, such as through roughness control. Thereby, enhancement is possible in such applications as harnessing of clean and renewable energy from ocean/river currents using devices, such as the ocean/river energy converter VIVACE.

2.4. New Elements of the Present Teachings

Figure 6:
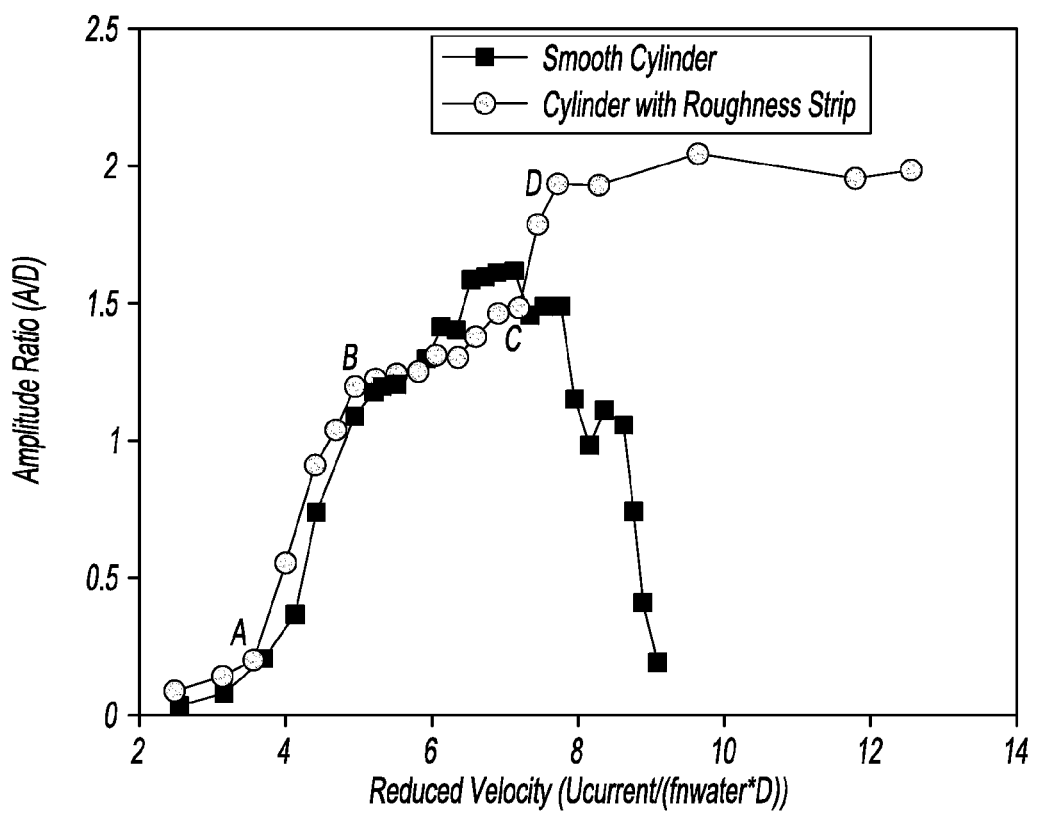
FIG. 6 is a graph illustrating the reduced velocity versus the amplitude ratio (A/D) of a 5.0" cylinder with and without roughness (Case 2)
Figure 8:
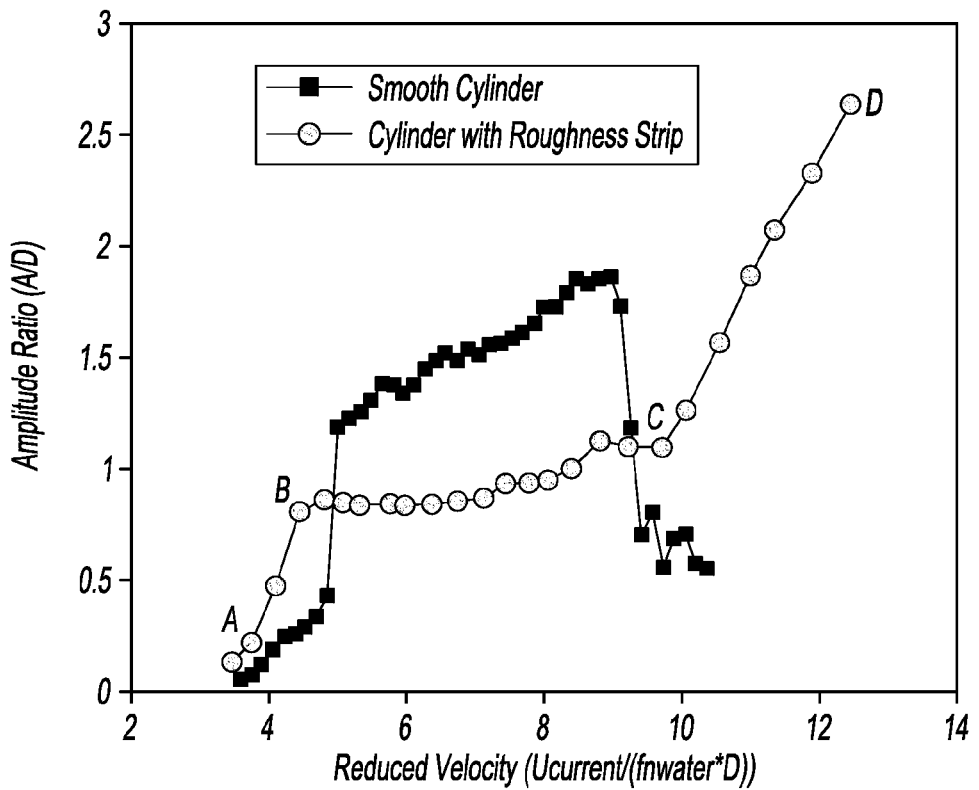
FIG. 8 is a graph illustrating the reduced velocity versus the amplitude ratio (A/D) of a 3.5" cylinder with and without roughness (Case 1)

The present teachings, specifically VIM-Enhance+SRC, are composed of simple and readily available components, which are described below, but define an innovative design based on many of the newly applied principles. Specifically, the present teachings may include one or more of the following attributes:

It can enhance Vortex Induced Forces and Motion of the structure in a relative flow as shown in FIG. 6 and FIG. 8. As an example, this is to improve performance of the converter which extracts hydrokinetic energy from fluid flows using vortex induced vibrations.

It can increases the spanwise flow correlation length to a high value by appropriate design of size and distribution of roughness on the surface of the body as shown in the example in FIG. 5.

It can increase the range of synchronization of VIFM of the structure in a relative flow as shown in FIG. 6 and FIG. 8.

It can affect the point of separation by appropriate design of size and distribution of roughness on the surface of the body.

Figure 11:
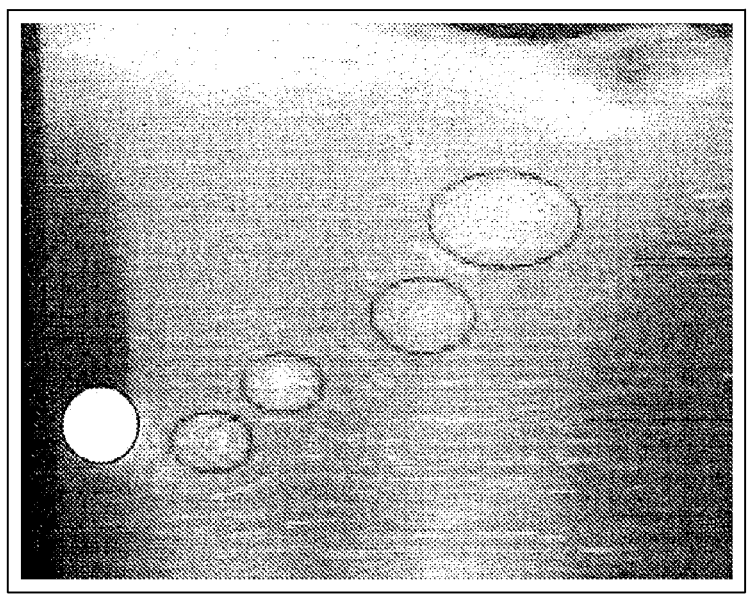
FIG. 11 is a preliminary visualization of wake in Case 1 showing four vortices in half cycle, with cylinder marked as a clear white circle.

It can affect the turbulence shed into the wake (see FIG. 11) by appropriate design of size and distribution of roughness on the surface of the body.

2.5. Description of the Present Teachings

Thickness of Roughness

In some embodiments, the size of the roughness for VIFM enhancement should be on the order of the boundary layer thickness so that the turbulent eddies created behind the roughness elements are of boundary layer size. This efficiently energizes the boundary layer.

Density of Roughness

In some embodiments, the density of roughness elements attached to the base has an impact on the amount of turbulence generated which subsequently determines whether VIFM will be enhanced.

Distribution of Roughness on the Surface

From the model tests on cylinder in VIV, conducted in Low Turbulence Free Surface Water Channel of the Marine Hydrodynamics Lab at the University of Michigan, Ann Arbor, it was found that for enhancement of VIV, roughness should be distributed as shown in FIG. 5. Specifically, the roughness strip or zone should cover the cylinder surface from about 57° to about 85° behind the mean position of the forward stagnation point (102). However, it should be appreciate that these angles may vary depending upon the exact design criteria and environment.

Base of Roughness Elements

In some embodiments, the thickness of the base is a critical element in VIFM control. For enhancement, the base supporting the roughness correlates the spanwise separation and the transition of the boundary layer. The base aids in the transition of the boundary layer which is enhanced downstream by the roughness elements.

3.1. Working Models

Six different models of the invention have been built and tested in the Low Turbulence Free Surface Water Channel of the Marine Hydrodynamics Laboratory at the University of Michigan, Ann Arbor. In our model tests, six different cylinders with diameters 1", 2.5", 3", 3.5", 5", 6" were used as a generic form of bluff body to demonstrate the concept.

Increase of amplitude was achieved depending on the orientation and size of the roughness elements. Increase of range of synchronization was achieved by optimal orientation and size of the roughness elements.

EXPERIMENTAL RESULTS

The following observations can be made relative to the amplitude ratio (A/D), the range of synchronization, the frequency of oscillation, the wake structure, and the critical roughness height. Please refer to Table 1 herebelow:

4.1. Amplitude of Oscillation and Synchronization Range:

A/D and range of synchronization for Cases 2 and 1 are shown in FIG. 6 and FIG. 8, respectively. For Case 2, A/D for the rough and smooth cylinders was nearly the same until the smooth cylinder VIV started reducing. An earlier reduction in A/D with respect to reduced velocity is observed in Case 2 in comparison to Case 1. This earlier reduction in amplitude of oscillation in Case 2 is attributed to the proximity of its operational Reynolds number to the critical regime. The roughness strips start taking effect at this point when the cylinder approaches the critical regime. The strips sustain and actually increase VIV. The roughness strips also increase the range of synchronization. This consequence can be attributed to straightening of the separation line by the roughness strip in the critical regime where the separation line for a smooth cylinder loses vortex shedding correlation. At the end of synchronization, the force correlation is nearly zero. In Cases 1 and 2, the roughness strips increase the force correlation in this regime by straightening out the separation line and energizing the separated fluid with velocity fluctuations which are higher harmonics of the fundamental oscillation. These resulted in synchronizing the vibration with the shedding of vortices. In Case 2, the amplitude was limited due to close proximity to the free surface at these high amplitudes. The proximity of a smooth cylinder to a free surface results in the Coanda effect suppressing VIV; but with the roughness strip VIV is sustained.

In Case 1, synchronization starts earlier for the rough cylinder. The initial A/D for the cylinder with roughness is lower than A/D for the smooth cylinder. This is observed in other cases too with different roughness strip configurations which are discussed later in relation to the critical Reynolds number. The amplitude ratio of oscillation reached values of 2.7 and the range of synchronization extended to reduced velocity of 13. In a few cases, the synchronization range extended to reduced velocity as high as 16. In Cases 1 and 2 with two strips, the range of synchronization started at an earlier reduced velocity and a jump in the frequency of oscillation was observed at a reduced velocity equal to four. In Case 3 with four strips, the range of synchronization started at an earlier reduced velocity and a jump in the frequency of oscillation was observed at a reduced velocity equal to 4.4. In all the roughness configurations used, the end of synchronization was not observed within the lab capabilities.

Figure 9:
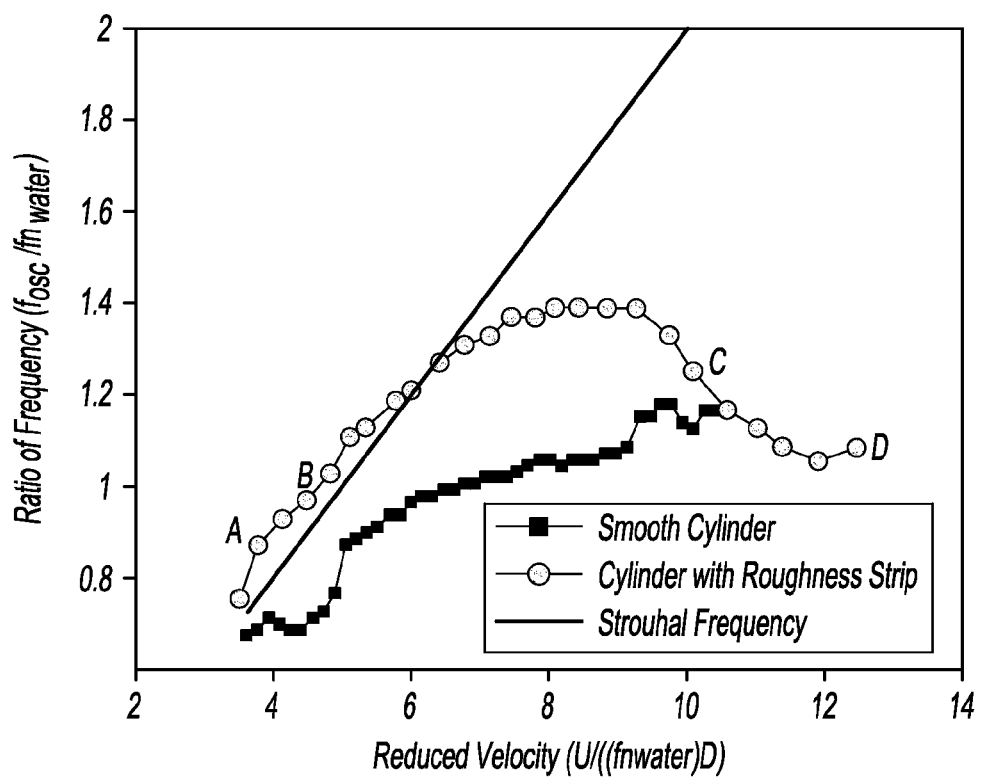
FIG. 9 is a graph illustrating the reduced velocity versus the ratio of frequency of a 3.5" cylinder with and without roughness (Case 1)
Figure 10:
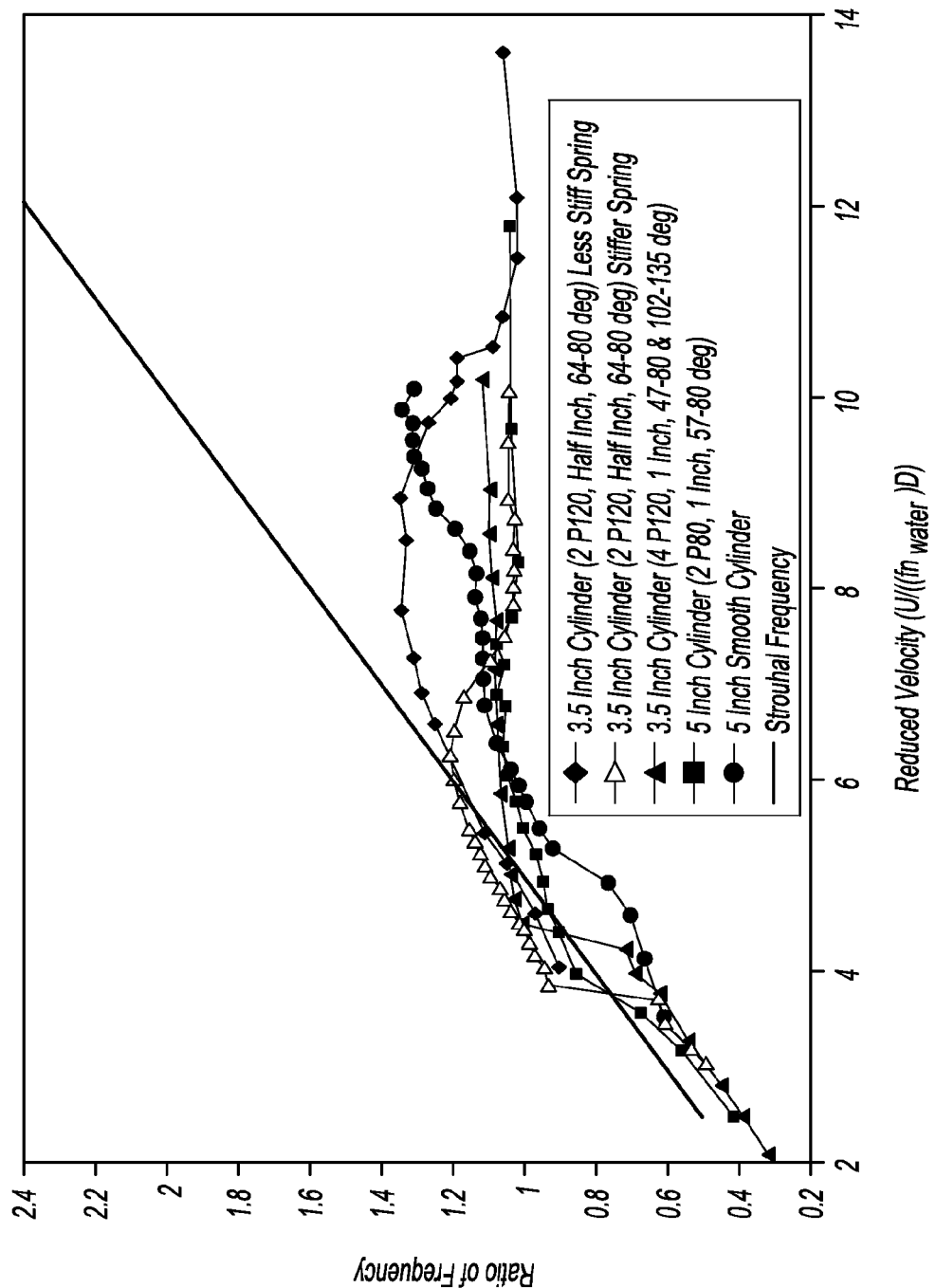
FIG. 10 is a graph illustrating the reduced velocity versus the ratio of frequency for different roughness distribution (Cases 1, 2, and 3; less stiff spring K=424N/m and stiffer spring K=872 N/m)

4.2. Frequency of Oscillation:

In Cases 1 and 2, where the end of the roughness strip is located at 80° and the front edge is located between 47°-64°, the frequency of oscillation locks to the natural frequency in water (added mass calculated using potential theory). In Cases 1 and 3, the frequency of oscillation initially increases and then curves downward to lock onto the natural frequency in water as the reduced velocity increases (FIG. 9 and FIG. 10). As the frequency of oscillation curves downward toward the natural frequency in water, the amplitude of vibration starts increasing from the plateau of lesser amplitude vibra-

Figure 7:
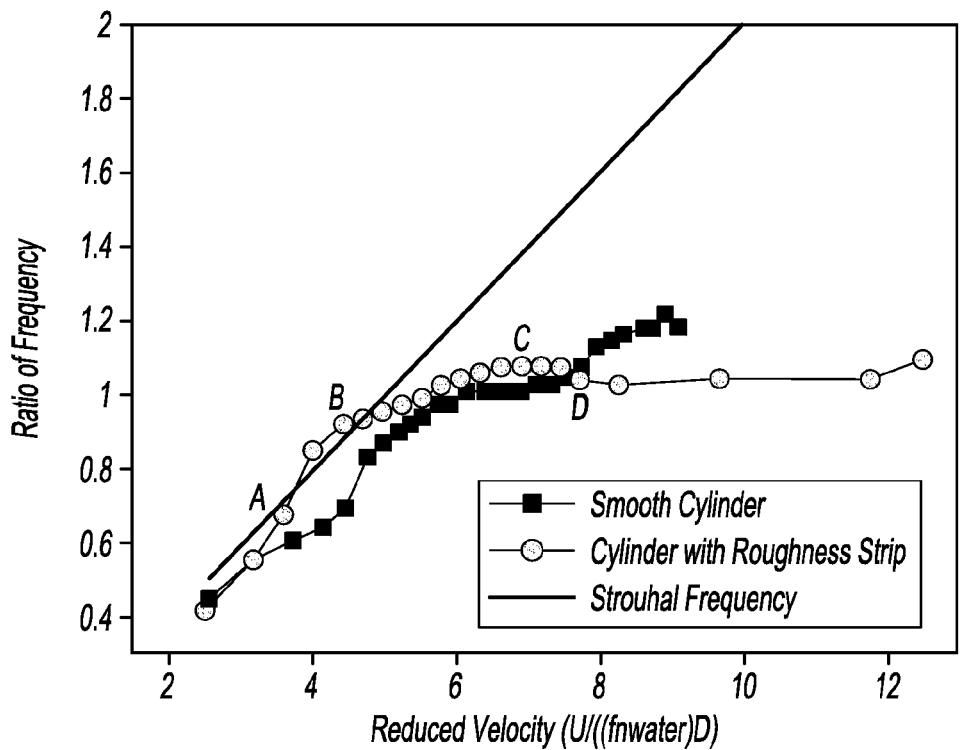
FIG. 7 is a graph illustrating the reduced velocity versus the ratio of frequency of a 5.0" cylinder with and without roughness (Case 2)

| Case | Sandpaper | Grit size k $(10^{-6}$ m) | Sandpaper thickness k + P $(10^{-6}$ m) | Diameter D (inch) | k/D | k + P/D | No. of strips | Circumferential angle |
|---|---|---|---|---|---|---|---|---|
| 1 | P120 | 125 | 508 | 3.5 | 0.0014 | 0.0057 | 2 | ±64°-±80° |
| 2 | P80 | 201 | 711 | 5.0 | 0.0016 | 0.0056 | 2 | ±57°-±80° |
| 3 | P120 | 125 | 508 | 3.5 | 0.0014 | 0.0057 | 4 | ±47°-±80° ±102°-±135° | tion as shown in FIG. 8. FIG. 7 compares the frequency ratio response of a 5" cylinder with and without roughness strips. In Case 2 of the 5" of the cylinder with roughness strips, lock on to the natural frequency is perfect over a large range of reduced velocity. For the smooth cylinder, the frequency of oscillation with the natural frequency of the system in water curves up which is attributed to the variation of the added mass with the reduced velocity and with A/D. In the case of smooth cylinder VIV in air, perfect lock on to the natural frequency of cylinder in air is observed due to the negligible added mass in comparison to the mass of the cylinder.

4.3. Wake Structure:

The roughness strips affect the wake mode of shedding, as evidenced by the higher harmonics of vortex shedding in the displacement spectrum. In the present experiments using roughness strips the corresponding amplitude and the reduced velocity are plotted on the Williamson-Roshko map. It is noticed that the plot passes through the desynchronization region in the map and reaches the 2P+2S region at higher reduced velocities. Further investigation was performed by using flow visualization and it was noticed that the number of vortices shed in half-period increased to four or five (FIG. 11) as the velocity of the flow increased. Limitations of the LTFSW Channel made it impossible to proceed further; VIV was so vigorous that could damage the Channel.

Figure 12:
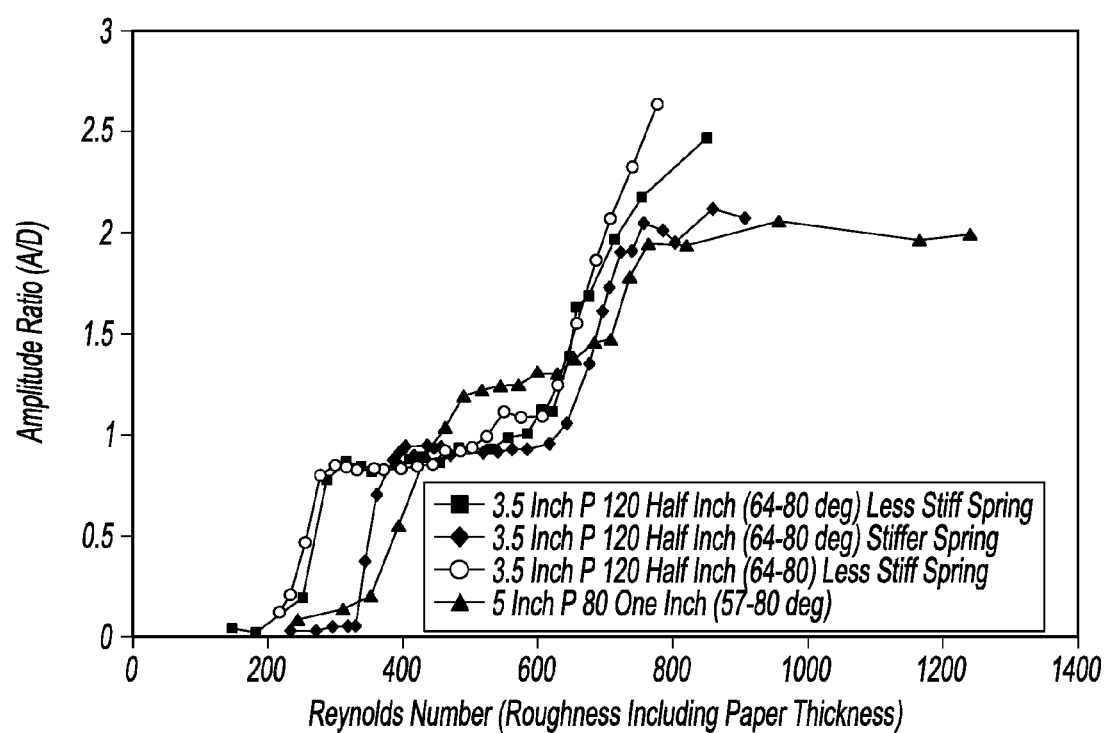
FIG. 12 is a graph illustrating Reynolds number versus amplitude ratio (A/D) of Cases 1 and 2 versus $Re_{k+p}$ (less stiff spring K=424N/m and stiffer spring K=872 N/m)
Figure 13:
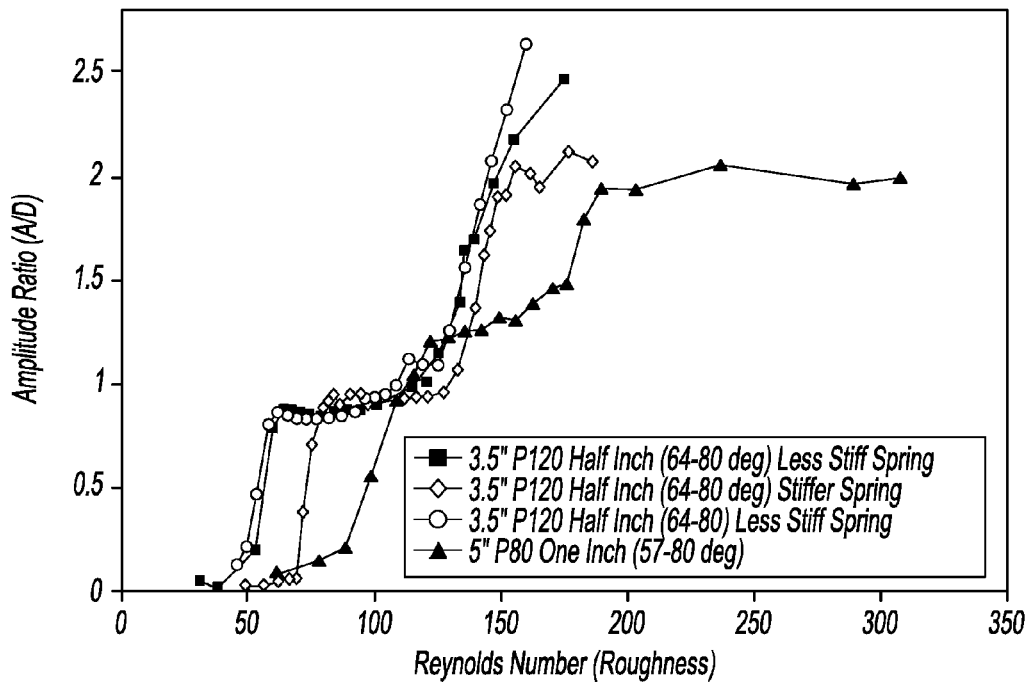
FIG. 13 is a graph illustrating Reynolds number versus amplitude ratio (A/D) of Cases 1 and 2 versus $Re_k$ (less stiff spring K=424N/m and stiffer spring K=872 N/m)
Figure 14:
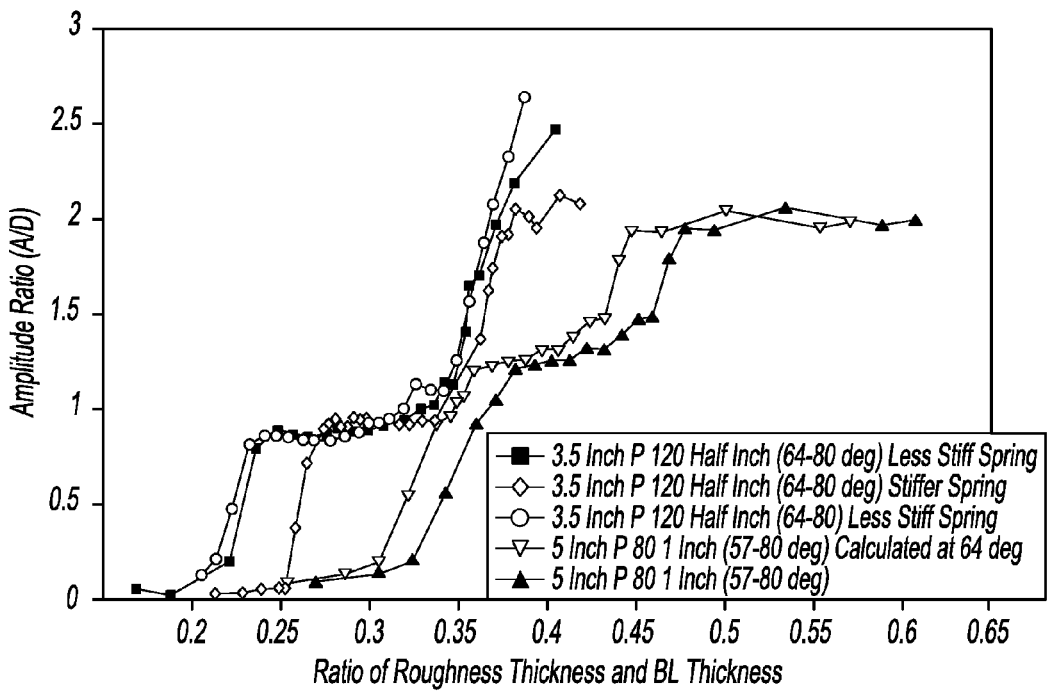
FIG. 14 is a graph illustrating ratio of roughness thickness, and BL thickness versus amplitude ratio (A/D) versus $k/\delta$ (less stiff spring K=424N/m and stiffer spring K=872 N/m)
Figure 15:
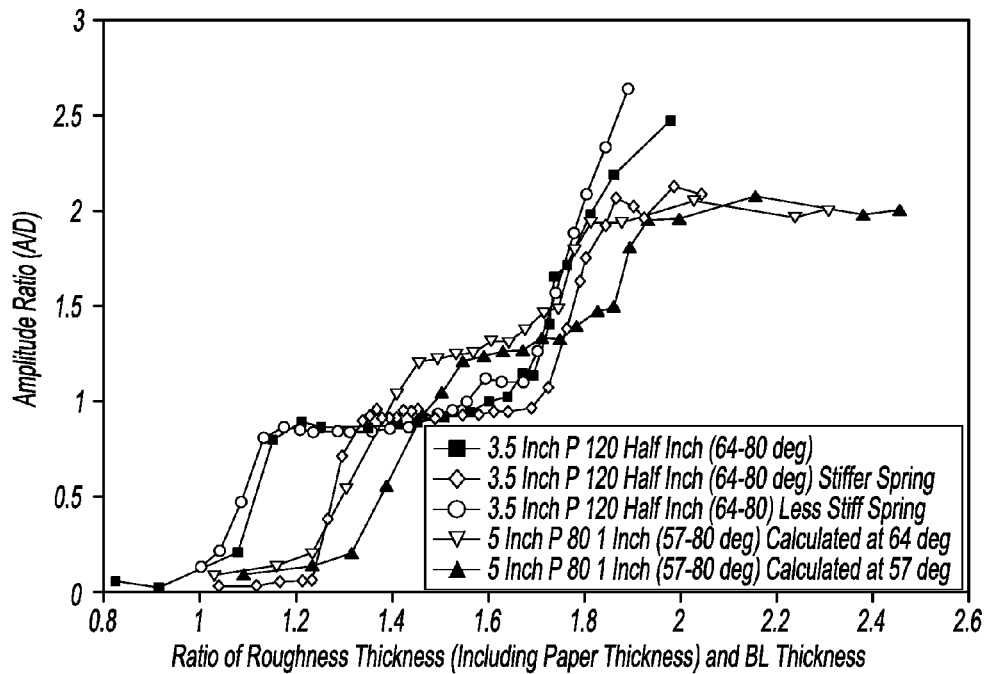
FIG. 15 is a graph illustrating ratio of roughness thickness, and BL thickness versus amplitude ratio (A/D) versus $(k+P)/\delta$ (less stiff spring K=424N/m and stiffer spring K=872 N/m)

4.4. Critical Roughness Height and Reynolds Number:

The boundary layer transition induced by surface roughness is a complex phenomenon. The effect of the roughness elements on the boundary layer depends on the size of the roughness elements relative to the boundary layer thickness. If the roughness elements lie completely within the laminar layer it is argued that the roughness has least effect on the flow. The surface is regarded as hydraulically smooth or rough based on whether the roughness elements are completely embedded or not in the laminar boundary layer. When the height of the roughness elements is on the order of the laminar boundary layer thickness, horseshoe eddies are shed around the roughness element and aid in transition of the boundary layer from laminar to turbulent. In the case of distributed roughness, turbulent "spots" are formed behind the roughness elements above a critical Reynolds number. Past experiments tried to explain partially what might be happening behind the rough particles in sandpaper. In the case of sandpaper, an agreement has never been reached as to the value of k or $Re_k$ at which transition occurs, due to the random distribution of the sandpaper particles and statistical non-uniformities. Transition for a single three-dimensional roughness element occurs by the formation of hairpin eddies behind the roughness particle. For sandpaper however, transition becomes complex because elements are closely packed. In FIG. 12 and FIG. 13, A/D is plotted versus $Re_k$, and $Re_k$+P. Rek is the Reynolds number pertinent to the roughness element size (k) and $Re_k$+P, is the Reynolds number pertinent to thickness of roughness strip (k+P) where P is the backing-paper thickness. In FIG. 12 in Cases 1 and 2 with different operational Reynolds number (Re) the results collapse at a critical value for the $Re_k$+P≈600–700. Above this critical value, jump in A/D to a higher value is observed (FIG. 12). In FIG. 13, the VIV response for both Cases 1 and 2 with different operational Reynolds number (Re) is plotted versus $Re_k$ and the results do not collapse as well as in FIG. 12.

In FIG. 13, for Case 1 with different operational Reynolds number (Re), the plots collapse. The jump in the amplitude of oscillation occurs above a critical value for $Re_k$≈120, which coincides with $Re_k$+P≈600–700. In Case 2, the jump to high amplitude occurs at $Re_k$≈180 and coincides with Rek+P≈600–700. $Re_k$≈120 is achieved right after the early jump from initial to upper branch, Point A to Point B in FIG. 6. It is hypothesized that this is the reason why the amplitude is not affected. In Case 2, the jump to the upper branch occurs at $Re_k$+P≈600–700 even though $Re_k$>120 is achieved earlier. In Case 1, with softer springs, $Re_k$≈120 is achieved at the end of synchronization of the smooth cylinder and the amplitude reduces by nearly half till $Re_k$+P≈600–700 and $Re_k$≈120 is reached. In Case 1 with stiffer springs, the synchronization range shifts to higher velocity/Reynolds number because of the shift in natural frequency. This implies that $Re_k$≈120 is achieved at a lower reduced velocity and the amplitude plot is not less affected than in Case 1 with softer springs. In all the 3.5" cylinder cases with stiff and soft springs, the jump from the upper branch to higher amplitude of oscillation occurs at $Re_k$+P≈600–700. The critical Reynolds number seen in the above cases $Re_k$+P≈600–700 and $Re_k$≈120 is close to the critical Reynolds number observed for three dimensional roughness elements and two dimensional roughness elements. In the cases analyzed above, the synchronization range occurs for $Re_D$>5×104.

Figure 16:
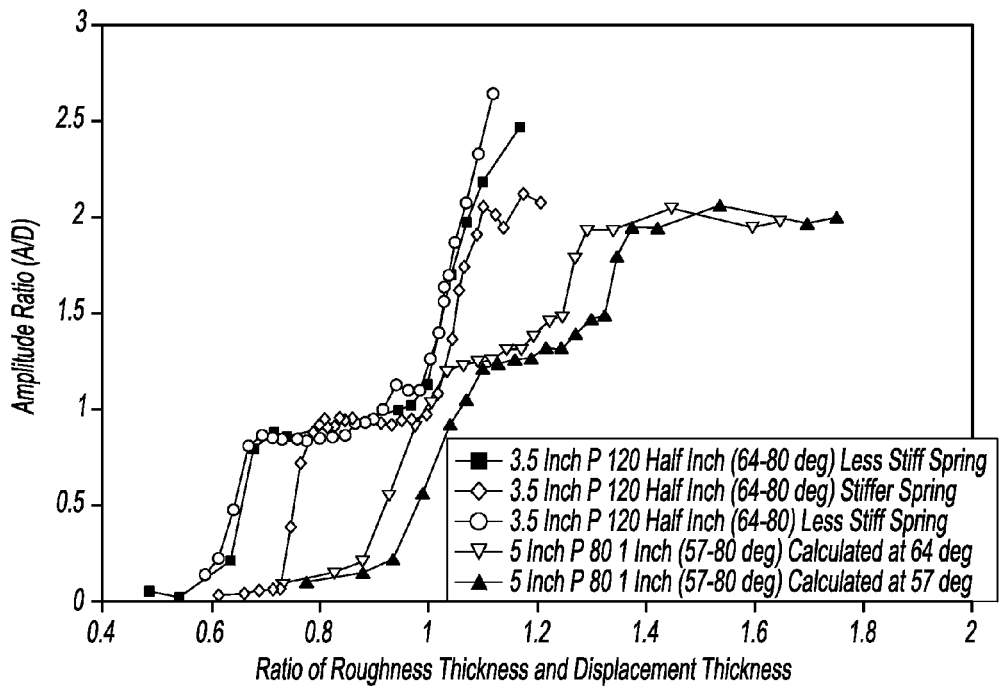
FIG. 16 is a graph illustrating ratio of roughness thickness, and BL thickness versus amplitude ratio (A/D) versus $k/\delta^*$ (less stiff spring K=424N/m and stiffer spring K=872 N/m)
Figure 17:
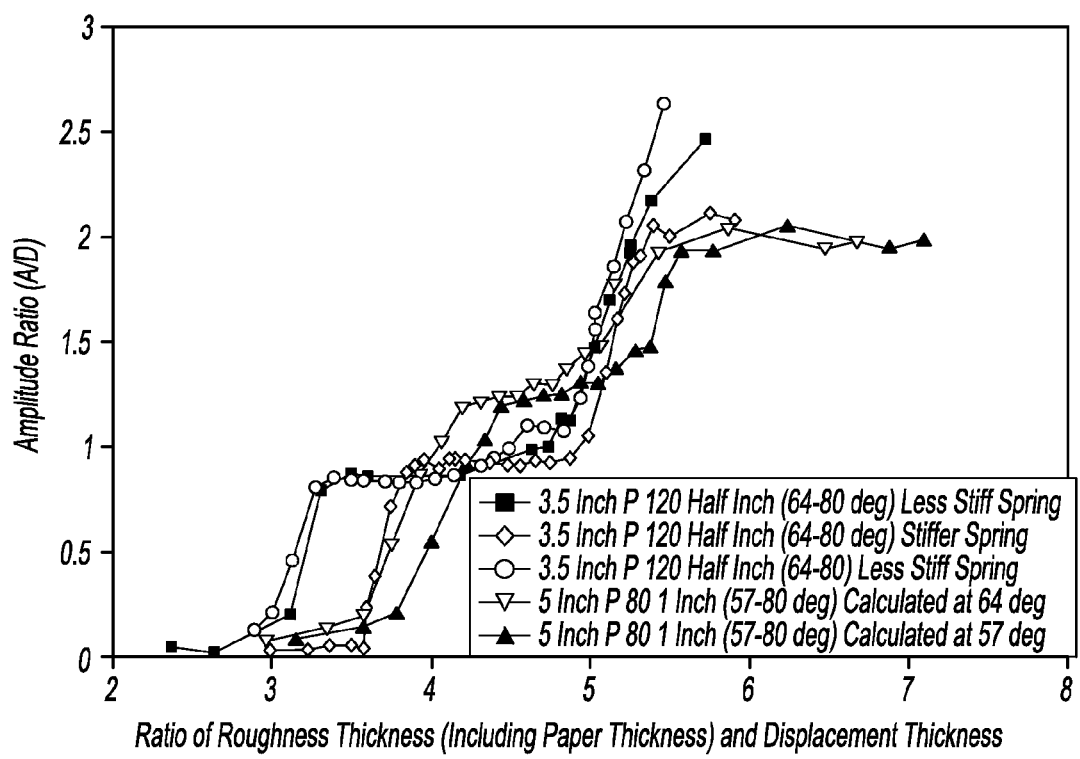
FIG. 17 is a graph illustrating ratio of roughness thickness, and BL thickness versus amplitude ratio (A/D) versus $(k+P)/\delta^*$ (less stiff spring K=424N/m and stiffer spring K=872 N/m).

For the high amplitude VIV in Cases 1 and 2, the experimental results are presented in FIG. 14 through FIG. 17 based on the ratio of roughness height to the boundary layer thickness (δ) and the ratio of roughness height to the boundary layer displacement thickness (δ*). The effect of roughness can be analyzed using the roughness height in comparison to the displacement and boundary layer thickness. In FIG. 16 and FIG. 17, the displacement thickness for Case 2 is recalculated at 640 in order to compare to Case 1. In our experiments, transition to high A/D VIV is observed when k/δ*≈1 and (k+P)/δ*≈1.6–1.7. When k/δ*<1, roughness elements are completely submerged underneath the displacement thickness and lower amplitude of oscillation is observed in the case of 3.5" cylinder with roughness strips in comparison to the smooth cylinder (FIG. 16). When the roughness element is larger than the displacement thickness it results in higher amplitude of oscillation (FIG. 16). The reason for the above observation can be hypothesized to be the following: When k/δ*≈1, then $Re_k$≈120 and this is the Reynolds number value around which transition in wake occurs behind a circular element. Therefore when k/δ*≈1, small eddies/vortices are formed behind the roughness elements. Those energize the flow and result in delayed separation. To confirm the above statement, visualization of the details behind roughness elements is needed.

5. Main Findings

To increase the power harnessed by the Converter, lift and amplitude of oscillation of the cylinder in high damping VIV need to be enhanced. Higher vorticity and resulting circulation are required. Increased range of VIV synchronization increases the robustness of the converter. The experimental results have shown that all requirements can be achieved by designing and distributing surface roughness based on the three Principles defined in the present disclosure. The results of the cylinder with roughness strips, undergoing VIV in the TrSL3 regime with a high (m*+Ca)ζ are summarized below:

1. Roughness strips were effective when placed in the range (57°-80°), which is the range of oscillation of the separation point. That resulted in increased synchronization range and A/D.

2. When roughness strips were attached to the cylinder in that range, the frequency of synchronization at high A/D or higher reduced velocity was found to be $f_{osc}=f_{n,water}$. For a smooth cylinder, the $f_{osc}$ detunes away from $f_{n,water}$.

3. When the roughness strips were attached to the cylinder aft of 80°, the range of synchronization increased but A/D decreased.

4. In the present experiments, an amplitude ratio of 2.7 was achieved and synchronization passed reduced velocity of 13. The end of synchronization was not observed within the lab's capabilities.

5. In general, roughness strips induced earlier start of synchronization by increasing the spanwise correlation length of vortex shedding.

6. A critical Reynolds number based on the roughness element size and the paper backing was determined, above which the roughness strip was effective for enhancing VIV. Below this critical Reynolds number ($Re_k+P<600$, $Re_k<120$) the roughness strip reduces the amplitude ratio in the original synchronization region.

7. An optimal designed roughness can enhance VIV without affecting the original synchronization range, as observed in Case 2.

8. When the roughness element was on the order of the boundary layer the flow around the cylinder was modified and the separation point was moved downstream.

9. In preliminary visualization, the wake constituted four vortices shed per half-cycle. Strategically arranged roughness can affect lock-in (synchronization) frequency.

10. When $k>\delta^*$ it brings considerable momentum from the outer flow into the boundary layer. Eddies that are already generated at the edge of the roughness strips by tripping the boundary layer interact more vigorously with the roughness elements when $k>\delta^*$.

11. For $k\approx\delta^*$ the scale of the vorticity generated by roughness is on the order of the boundary layer vorticity scale. This enhances the strength of the Karman vortices because the boundary layer scale vorticity is absorbed into the Karman vortices.

12. In FIG. 6, point B is the same for smooth and rough cylinders. Concurrently at B ($Re_k=120$), first, k introduces friction resulting in pressure loss which would cause reduction in A/D; and second, since at this $Re_k$ $k=\delta^*$, it brings in turbulence from the outer higher momentum flow thus generating vorticity still at the boundary layer scale. That is absorbable by Karman vortices, which counterbalances the friction change in A/D that we hypothesized.

3.2. Alternative Implementations

Several variations of the present teachings of VIM-Enhance+SRC or components thereof may be equally effective in achieving VIFM control using surface roughness control. Specifically:

Control of VIFM through roughness maybe passive or active. Passive control was described above. Active control, however, can be achieved by raising or by lowering surface roughness or components 100 (FIG. 1) thereof in response to flow variations. This can be achieved through mechanically actuated excrescences, electrically actuated excrescences, and the like (generally indicated at 102 in FIG. 1). In other words, the roughness zone of the present teachings can be an actively controllable roughness zone operable between a first roughness state and a second roughness state (e.g. a change between k and k' in FIG. 1), said first roughness state being different than said second roughness state. Such differences could include roughness size, roughness density, roughness configuration, or any other parameter effect fluid flow thereby.

The type of material used to fabricate surface roughness can be any material which satisfies the following requirements: Be rigid or flexible; have rough or smooth individual roughness elements; roughness elements can be metallic, composite, plastic or any other natural or manmade product.

The configuration of the surface roughness can have any form that can be modeled using its size, amount, distribution, and density as described in this disclosure. One of the possible configurations is shown in FIG. 3 through FIG. 5 where $\alpha_{bu}$ is the angle of the beginning of the location of the roughness strip at the upper part of the body, $\alpha_{bl}$ is the angle of the beginning of the location of the roughness strip at the lower part of the body, $\theta_u$ is the angle of the roughness strip at the upper part of the body, and $\theta_l$ is the angle of the roughness strip at the lower part of the body.

Unique Benefits

The disclosed teachings of VIM-Enhance+SRC can be used to enhance VIFM. We have implemented SRC in VIVACE converter models and enhanced its VIFM and improved its efficiency in extracting energy from fluid flows drastically. Ocean or fresh moving water provides clean and renewable energy. The total energy flux due to surface and underwater currents of the world has been estimated at 280 trillion watt-hours. The converter can be improved by implementing the present teachings thus, making it possible to harness more efficiently some of this abundant clean and renewable ocean/river energy. Implementation of VIM-Enhance+SRC is simple.

What is claimed is:

1. A system for enhancing vortex induced forces on a bluff body disposed in a fluid, the fluid moving relative to the bluff body, said system comprising:
    said bluff body having a surface, said bluff body being shaped to define a linear body dimension being the largest linear dimension of a cross section of said bluff body in the plane of the flow of the fluid, said bluff body being moveable in at least a direction generally perpendicular to the flow of the fluid; and
    a roughness zone disposed on said surface, said roughness zone defining a roughness height extending above said surface that is less than or equal to 5% of said linear body dimension, said roughness zone modifying the flow of the fluid to enhance fluid induced motion of said bluff body in the direction generally perpendicular to the flow of the fluid.

2. The system according to claim 1 wherein said roughness zone comprises a base and a grit, said grit being disposed on said base.

3. The system according to claim 1 wherein said roughness zone is disposed on only a portion of said surface.

4. The system according to claim 1 wherein said roughness zone comprises a member coupled to said bluff body.

5. The system according to claim 4 wherein said member comprises sandpaper.

6. The system according to claim 1 wherein said roughness zone is integrally formed on said surface of said bluff body.

7. The system according to claim 1 wherein said roughness zone comprises an actively controllable roughness zone operable between a first roughness state and a second roughness state, said first roughness state being different than said second roughness state.

8. The system according to claim 1 wherein said bluff body is a cylinder defining a stagnation point and said roughness zone being disposed between about 57° and 85° behind said stagnation point when measured along an axis of said cylinder.

9. A system for enhancing vortex induced forces on a cylindrical bluff body disposed in a fluid, the fluid moving relative to the bluff body, said system comprising:
    said cylindrical bluff body having a surface, said cylindrical bluff body defining a bluff body diameter, said cylindrical bluff body being moveable in at least a direction generally perpendicular to the flow of the fluid; and a roughness zone disposed on said surface, said roughness zone defining a roughness height extending above said surface that is less than or equal to 5% of said bluff body diameter, said roughness zone modifying the flow of the fluid to enhance fluid induced motion of said cylindrical bluff body in the direction generally perpendicular to the flow of the fluid.

10. The system according to claim 9 wherein said roughness zone comprises a base and a grit, said grit being disposed on said base.

11. The system according to claim 9 wherein said roughness zone is disposed on only a portion of said surface.

12. The system according to claim 9 wherein said roughness zone comprises a member coupled to said bluff body.

13. The system according to claim 12 wherein said member comprises sandpaper.

14. The system according to claim 9 wherein said roughness zone is integrally formed on said surface of said bluff body.

15. The system according to claim 9 wherein said roughness zone comprises an actively controllable roughness zone operable between a first roughness state and a second roughness state, said first roughness state being different than said second roughness state.

16. The system according to claim 9 wherein said bluff body is a cylinder defining a stagnation point and said roughness zone being disposed between about 57° and 85° behind said stagnation point when measured along an axis of said cylinder.

* * * * *

UNITED STATES PATENT AND TRADEMARK OFFICE
CERTIFICATE OF CORRECTION

PATENT NO. : 8,047,232 B2
APPLICATION NO. : 12/277321
DATED : November 1, 2011
INVENTOR(S) : Michael M. Bernitsas and Kamaldev Raghavan Page 1 of 1

It is certified that error appears in the above-identified patent and that said Letters Patent is hereby corrected as shown below:

Column 1, line 54, after "SRC", insert --.--.

Column 6, line 64, "increases" should be --increase--.

Column 7, line 29, "appreciate" should be --appreciated--.

Column 9, line 66, "Rek" should be --$Re_k$--.

Column 10, line 29, "640" should be --64°--.

Column 11, line 46, "maybe" should be --may be--.

Signed and Sealed this
Thirty-first Day of January, 2012

David J. Kappos
*Director of the United States Patent and Trademark Office*